United States Patent
Kobayashi

(10) Patent No.: US 6,934,815 B2
(45) Date of Patent: Aug. 23, 2005

(54) METHOD AND APPARATUS USED FOR DATA COMMUNICATION BETWEEN PROCESSORS, AND DATA PROCESSING APPARATUS

(75) Inventor: Kenichi Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 103 days.

(21) Appl. No.: 09/790,694

(22) Filed: Feb. 23, 2001

(65) Prior Publication Data

US 2002/0016888 A1 Feb. 7, 2002

(30) Foreign Application Priority Data

Aug. 1, 2000 (JP) ........................................ 2000-233609

(51) Int. Cl.[7] .............................................. G06F 12/00
(52) U.S. Cl. ...................... 711/147; 711/148; 711/150; 709/213; 709/214
(58) Field of Search ............................... 711/149–153; 709/200, 212–214

(56) References Cited

U.S. PATENT DOCUMENTS

| | | | | |
|---|---|---|---|---|
| 5,418,913 A | * | 5/1995 | Fujimoto | 707/104.1 |
| 5,671,446 A | * | 9/1997 | Rakity et al. | 710/54 |
| 5,922,057 A | * | 7/1999 | Holt | 709/234 |
| 6,055,618 A | * | 4/2000 | Thorson | 370/254 |
| 6,229,813 B1 | * | 5/2001 | Buchko et al. | 370/235 |
| 6,341,301 B1 | * | 1/2002 | Hagan | 709/100 |
| 6,523,060 B1 | * | 2/2003 | Kao | 709/202 |

FOREIGN PATENT DOCUMENTS

| | | |
|---|---|---|
| JP | 01-246656 | 10/1989 |
| JP | 03-245258 | 10/1991 |
| JP | 01-357022 | 12/2001 |

OTHER PUBLICATIONS

Valois, John D., "Lock–Free Linked Lists Using Compare and Swap", 1995, Rensselaer Polytechnic Institute.*

* cited by examiner

*Primary Examiner*—Matthew Kim
*Assistant Examiner*—Woo H. Choi
(74) *Attorney, Agent, or Firm*—Staas & Halsey LLP

(57) ABSTRACT

A queue is provided on a memory shared accessed by both a writing processor and a reading processor. This queue comprises a plurality of elements and an empty element are linked together. The element is composed of a communication information area and a mark area. The element is a memory area of a 1-access unit where writing and reading are possible with one access. The writing processor writes communication information, connection information showing connection states between the elements and information relating to registering/non-registering of the communication information into the empty element with one access. The reading processor reads the communication information, the connection information and the information relating to registering/non-registering with one access. As a result, it is not necessary to put exclusive lock on the queue.

8 Claims, 13 Drawing Sheets

METHOD AND APPARATUS USED FOR DATA COMMUNICATION BETWEEN PROCESSORS, AND DATA PROCESSING APPARATUS

FIELD OF THE INVENTION

This invention in general relates to a technology used for data communication between processors. More specifically, this invention relates to a technology applied to a multi-processor system in which a shared memory is provided between a plurality of processors, and in which communication between the processors is performed via a queue on the shared memory.

BACKGROUND OF THE INVENTION

In recent years, large-scale multi-processor systems have been put into practice, and simultaneously a software technique using a plurality of processors has progressed. This multi-processor system is composed of a plurality of processors and a shared memory, and is constituted so that the plural processor are operated in parallel, thereby improving processing speed, throughput and reliability so as to compose a computer system having higher performance than that of a single processor. In the multi-processor system, it is indispensable to keep coherence of data between the processors, and this coherence is maintained by using a queue on the shared memory according to various methods.

FIG. 14 is a block diagram showing a structure of a conventional multi-processor system. For explanation, in the multi-processor system shown in this diagram, a writing processor 1 and a reading processor 2 are provided to a writing side and a reading side respectively. The writing processor 1 and the reading processor 2 are connected accessibly to a shared memory 3 via a data bus B. This shared memory 3 is a memory as a resource which is commonly used between the writing processor 1 and the reading processor 2. Three or more processors are occasionally provided according to a scale of systems.

The writing processor 1 has an arithmetic section 1a for performing various arithmetic calculations, a data reading section 1b for reading data from the shared memory 3 via the data bus B, and a data writing section 1c for writing data into the shared memory 3 via the data bus B. Similarly, the reading processor 2 has an arithmetic section 2a, a data reading section 2b and a data writing section 2c.

There will be explained below an example that data communication is performed from the writing processor 1 to the reading processor 2 via the data bus B and the shared memory 3. This communication is performed via a queue (waiting line) 4 on the shared memory 3 as shown in FIG. 15 in order to maintain coherence of data between the processors. Namely, the communication data are written into the shared memory 3 by the writing processor 1 and are read by the reading processor 2 so as to be transmitted from the writing processor 1 to the reading processor 2.

The writing processor 1 performs the following operations:

A1. Securing a memory area for communication;

A2. writing communication data (information) into the memory area; and,

A3. registering the secured memory area into the queue 4.

More concretely, in the operation A1, the memory area into which communication data (information) to be transmitted to the reading processor 2 are written is secured in the shared memory 3. In the operation A2, the communication data are written into the memory area secured in the operation A1. Further, in the operation A3, the memory area secured in the operation A1 is registered in the queue 4. Here, the memory area and the queue 4 exist on the shared memory 3, and they are referred to by a plurality of processors. As a result, it is necessary to protect them by means of exclusive lock, mentioned later.

Further, the above-mentioned operation A3 has concretely the following steps:

A3-1. obtaining exclusive lock which protects the queue 4,

A3-2. operating the queue 4, and

A3-3. releasing the exclusive lock which protects the queue 4.

The reading processor 2 performs the following operations:

B1. obtaining a memory area form the queue 4,

B2. reading communication data (information) from the memory area, and

B3. releasing the memory area when the communication (reading) is ended.

More concretely, in the operation B1, a memory area into which communication data are written is obtained by the reading processor 2 in the shared memory 3. In the operation B2, the communication information is read from the memory area obtained in the operation B1. Further, in the operation B3, the memory area obtained in the operation B1 is released.

The operation B1 has the following steps:

B1-1. obtaining exclusive lock which protects the queue 4,

B1-2. operating the queue 4, and

B1-3. releasing the exclusive lock which protects the queue 4.

A structure of the queue 4 (see FIG. 15) in the conventional multi-processor system, and the writing/reading operation will be explained here with reference to FIG. 16. The queue 4 shown in top of FIG. 16 has elements 5a, 5b and 5c which are linked together, memory areas 6a, 6b and 6c corresponding to the elements 5a, 5b and 5c respectively, a registering place information area 7, and a obtaining place information area 8. Connection information which shows that a connecting destination is the element 5b is written into the element 5a, and similarly connection information which represents that a connecting destination is the element 5c is written into the element 5b. Namely, the connecting relationship in the elements 5a, 5b and 5c is defined by the connection information.

Communication data are registered (written) into the memory areas 6a, 6b and 6c by the writing processor 1 (see FIG. 15). Further, the respective communication data registered into the memory areas 6a, 6b and 6c are obtained (read) by the reading processor 2 (see FIG. 15). Registering place information relating to registering place of the communication data (elements, memory areas) is written into the registering place information area 7 by the writing processor 1. Moreover, the communication data are written into the memory area which is specified by the registering place information. Obtaining place information relating to an obtaining place (elements, memory areas) of the communication data is written into the obtaining place information area 8 by the reading processor 2.

The diagram in the middle of FIG. 16 explains an operation of the queue 4 at the time of registering by means of the writing processor 1. At the time of the registering, the above-mentioned exclusive lock is put on the queue 4 so that only the writing processor 1 operates the queue 4. This exclusive lock protects the queue 4 from processors other than the writing processor 1 (in this case, the reading processor 2). In this drawing, the writing processor 1 obtains the exclusive lock and secures the memory area 6d (element 5d) after obtaining the exclusive lock. Next, the writing processor 1 writes the communication data into the memory area 6d, and updates the registering place information written into the registering place information area 7.

More concretely, when the registering place information relating to the memory area 6c (element 5c) is written into the registering place information area 7, the writing processor 1 updates the registering place information into registering place information relating to the memory area 6d (element 5d) which is the next registering destination. Here, when communication information is not written into any memory areas, the writing processor 1 performs the operation on the registering place information of the registering place information area 7, and also performs an operation on obtaining place information of the obtaining place information area 8. Further, the writing processor 1 performs the operation on the connection information which defines a connection relationship between the element 5c and the element 5d, and releases the exclusive lock.

The diagram in the bottom of FIG. 16 explains the operation of the queue 4 at the time of obtaining by means of the reading processor 2. At the time of the obtaining, similarly to the writing processor 1, the exclusive lock is put on the queue 4 so that only the reading processor 2 operates the queue 4. In this drawing, the reading processor 2 obtains the exclusive lock, and obtains the memory area 6a (element 5a) based on the obtaining place information of the obtaining place information area 8. Next, the reading processor 2 reads the communication data written into the memory area 6a, and releases this memory area. The reading processor 2 updates the obtaining place information written into the obtaining place information area 8.

More concretely, when obtaining place information relating to the memory area 6a (element 5a) is written into the obtaining place information area 8, the reading processor 2 updates the obtaining place information into obtaining place information relating to the memory area 6b (element 5b) which is the next obtained destination. Here, when communication information is not written into any memory areas, the reading processor 2 performs the operation on the obtaining place information of the obtaining place information area 8, and also performs the operation on the registering place information of the registering place information area 7. Further, the reading processor 2 performs the operation on the connection information in order to release the connection between the element 5a and the element 5b shown in FIG. 16(a), and releases the exclusive lock. In such a manner, the writing processor 1 and the reading processor 2 perform the operations on three pieces of information such as (A) connection information, (B) registering place information and (C) obtaining place information.

In the conventional processor system, for example, the operations (obtaining/releasing) relating to the exclusive lock in A3-1 and A3-3, and the operations (obtaining/releasing) relating to the exclusive lock in B1-1 and B1-3 require longer time than normal memory operations such as reading and writing from/into a memory. For this reason, there arises a problem that a processing speed is lowered.

Practically, the writing processor 1 and the reading processor 2 communicate while protecting data to be treated via the exclusive lock, and access from a plurality of processors is concentrated on the exclusive lock. This causes a deterioration of the software performance. In addition, when the access is not concentrated on the exclusive lock, the operation relating to the exclusive lock require time which is 100 to 1000 times as much as the normal memory access. For this reason, the above problem cannot be ignored when fine data are treated.

In addition, instead of the exclusive lock, there exists a method of protecting a memory exclusively by performing the writing operation and the reading operation inseparably on the queue 4. However, also in this case, since the processing time becomes long similarly to the exclusive lock, this method does not solve the problem basically.

SUMMARY OF THE INVENTION

It is an object of the present invention to provide an apparatus used for data communication between processors (hereafter, interprocessor data communication apparatus), a method used for data communication between processors (hereafter, interprocessor data communication), and a data processing apparatus which are capable of eliminate an operation relating to exclusive lock and improving a processing speed in a communication between multi-processors via a shared memory and a queue.

In the interprocessor data communication apparatus according to one aspect of the present invention, in the queue having the plural element and the empty element for operating the data on the shared memory, after an empty element is newly secured by the registering unit at the time of registering, data are registered with one access. Meanwhile, the obtaining unit obtains an element of the plural elements where the data are registered, and reads the data from the obtained element with one access. As a result, the area where a plurality of processors performs the queue operation simultaneously is divided, and thus the operation relating to exclusive lock is not necessary. As a result, the processing speed can be improved.

Other objects and features of this invention will become apparent from the following description with reference to the accompanying drawings.

DESCRIPTION OF THE PREFERRED EMBODIMENTS

Four preferred embodiments of the interprocessor data communication apparatus, the interprocessor data communication method and a data processing apparatus according to the present invention are explained in detail below with reference to the attached drawings.

According to the first embodiment, the interprocessor data communication apparatus of the present invention is applied to a general-purpose multi-processor system having a shared memory. The multi-processor system in the first embodiment eliminates the necessity of exclusive lock without adding a new hardware, and realizes high-speed queue operation between processors.

Figure 14:
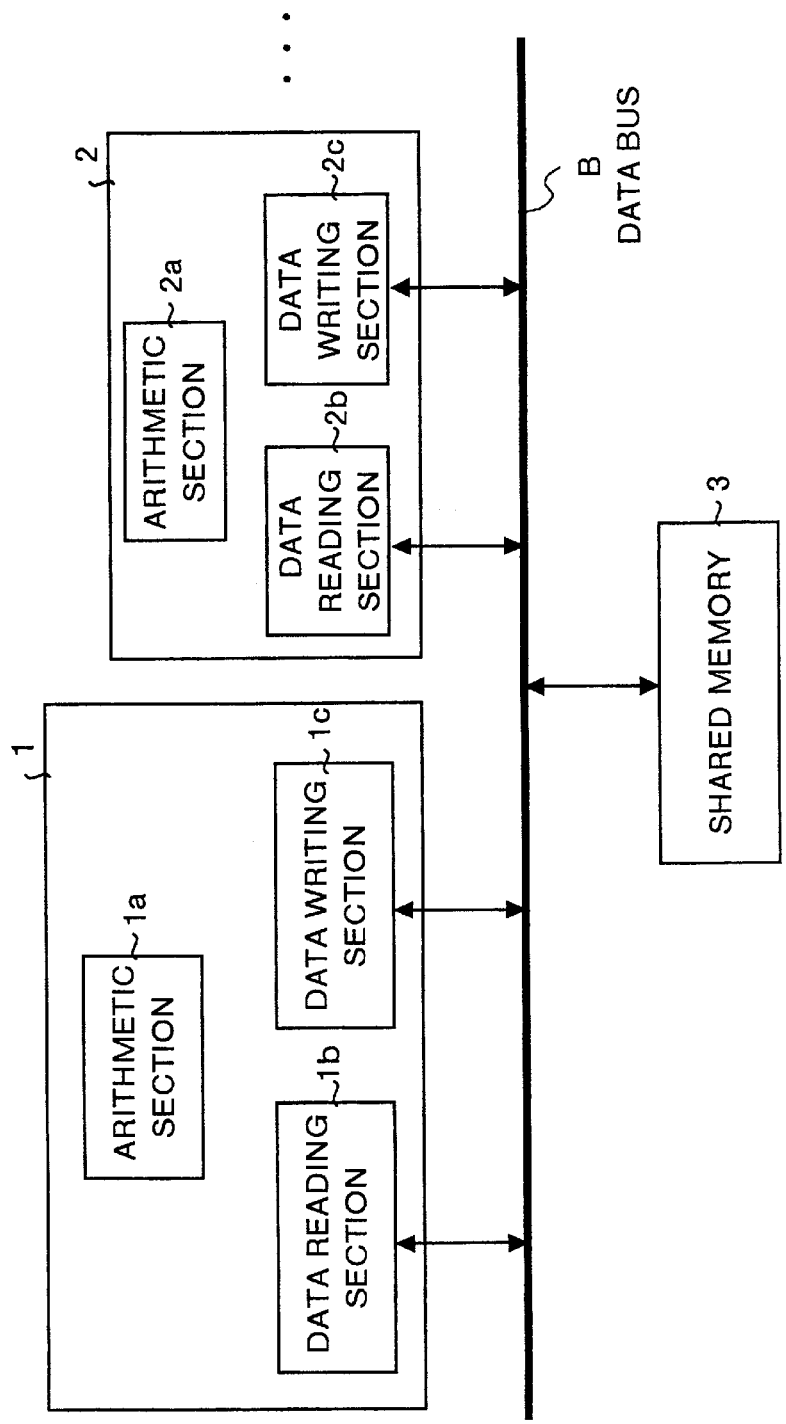
FIG. 14 is a block diagram showing a structure of a conventional multi-processor system.

The structure of the hardware is the same as the above-mentioned structure shown in FIG. 14, therefore, the description will be given by using the same reference numerals. However, the queue structure of a shared memory 3 and functions of a writing processor 1 and a reading processor 2 are different from the conventional ones. The queue structure and the functions will be detailed later.

As mentioned above, when the writing processor and the reading processor are separate, it is necessary for keeping coherence of data between processors that the processor which can access to a queue simultaneously is limited to only one processor. Exclusive lock is a unit for limiting the access, and an operation relating to the exclusive lock is necessary for the queue which is operated by a plurality of processors.

In the first embodiment, as for the respective processors which operate the queue, areas where the processors simultaneously operate the queue are separated as much as possible so that areas which should be protected are reduced. As a result, the necessity of the operation relating to the exclusive lock is eliminated even in a general hardware which does not have a special apparatus.

The queue operation in data communication is divided into two kinds of operations:

(1) registering and obtaining elements of the queue; and
(2) writing (registering) and reading (obtaining) communication information.

In operation 1, the registering and obtaining the elements of the queue, as mentioned above, requires operations on the following three pieces of information:

(A) connection information between the elements of the queue;
(B) registering place information showing registering places into the queue; and
(C) obtaining place information showing obtaining places from the queue.

In the conventional technique, since it is necessary that the writing processor 1 and the reading processor 2 read/write these three pieces of information, the protection by means of the exclusive lock is indispensable. On the contrary, in the first embodiment, in addition to the normal elements having information, "empty element" is registered into the registering place of the queue so that the information to be operated by the writing processor 1 is limited to two pieces of information, (A) connection information and (B) registering place information in the above-mentioned three pieces of the information. Similarly, information to be operated by the reading processor 2 is limited to (A) connection information and (C) obtaining place information in the three pieces of the information.

In the first embodiment, the "empty element" is registered separately from the normal elements so that the information which is commonly operated by the writing processor 1 and the reading processor 2 is only the (A) connection information in the three pieces of information. At this stage, it is necessary to protect the (A) connection information by means of the exclusive lock, but in the first embodiment, the writing processor 1 performs only the writing operation on the (A) connection information, whereas the reading processor 2 performs only the reading operation on the (A) connection information.

Furthermore, in the first embodiment, a maximum memory area (for example, 8 bytes) where the writing processor 1 and the writing processor 2 can perform the writing/reading operation with one access is the element of the queue. Here, a unit of the memory area is a 1-access unit. In such a manner, the (A) connection information is incorporated in the element of the queue in the 1-access unit so that the writing processor 1 and the reading processor 2 can perform the writing/reading operation on the (A) connection information with one access. Therefore, in the first embodiment, it is not necessary to protect the operation on the (A) connection information using the exclusive lock.

Further, in the first embodiment, the writing processor 1 writes information of writing completion, which shows as to whether the whole (2) communication information is written into the memory area, into the above-mentioned element of the 1-access unit. Particularly in the case of the communication information with small data amount, the written communication information itself can be information of writing completion. Meanwhile, the reading processor 2 reads the information of writing completion and judges as to whether or not the communication information is readable. This method eliminates the necessity of the protection by means of the exclusive lock similarly to (1).

In addition, three pieces of the above connection information, communication information and information of writing completion can be stored in the element of the 1-access unit, and the writing processor 1 can complete the operation for writing the three pieces of information into the element with one access. Namely, the writing processor 1 performs the three operations for writing the connection information, the communication information and the information of writing completion with one access inseparably.

Similarly, the reading processor 2 also performs the three operations for reading the three pieces of information from the element with one access inseparably. In the first embodiment, the area necessary for the memory operations (1) and (2) is confined within the element of the 1-access unit (memory area) so that the respective operations can be performed simultaneously with one memory access. For this reason, in conclusion, the whole queue operation can be performed without performing the operation relating to the exclusive lock.

Figure 1:
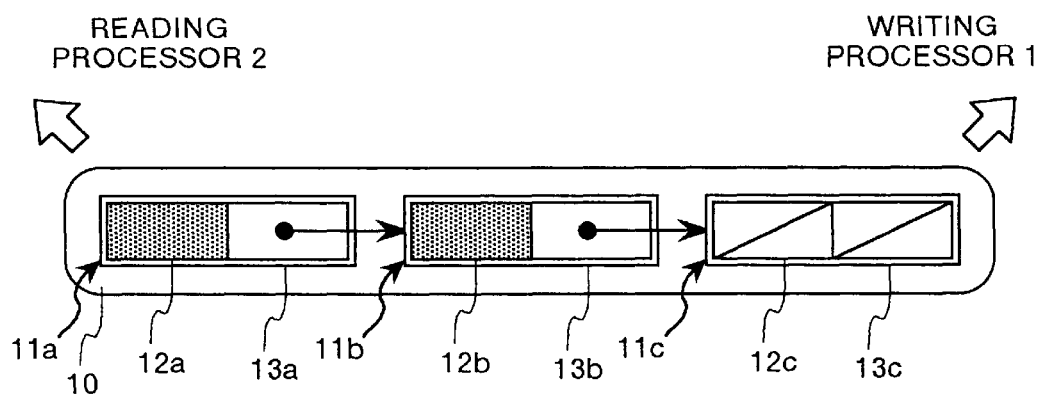
FIG. 1 is a structural diagram for schematically explaining an interprocessor data communication apparatus according to a first embodiment of the present invention.
Figure 15:
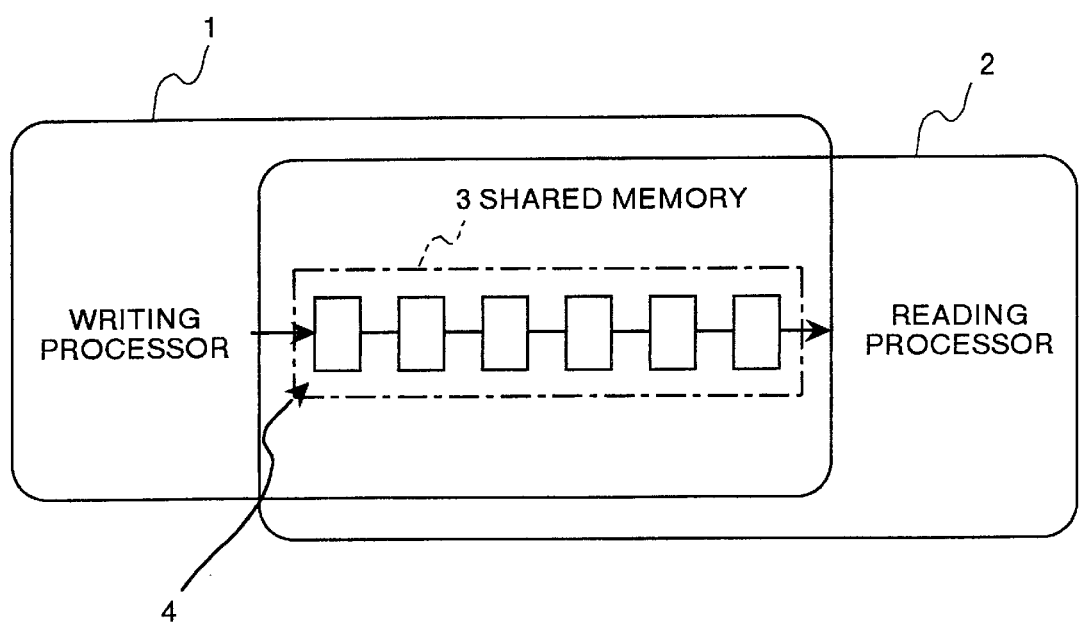
FIG. 15 is a diagram showing a structure of a shared memory 3 in the conventional multi-processor system.

Next, the concrete example will be given. FIG. 1 is a structural diagram for schematically explaining the interprocessor data communication apparatus according to the first embodiment of the present invention. Here, for explanation, the whole structure of the processor system is such that the writing processor 1 and the reading processor 2 are provided similarly to the conventional structure shown in FIGS. 14 and 15. In FIG. 1, a queue 10 exists on the shared memory 3 (see FIG. 14), and its structure is different from that of the queue 4.

Namely, the queue 10 is composed of an element 11a, element 11b and an "empty" element 11c which are linked together. The element 11a is a maximum memory area where the writing processor 1 and the reading processor 2 can perform the writing/reading operation with one access. This memory area is the above-mentioned area of the 1-access unit, and data for 8 bytes, for example, can be written/read in this area with one access. Further, the element 11a is composed of a communication information area 12a for 4 bytes, and a mark area 13a for 4 bytes.

A communication data within 4 bytes, or a pointer, which shows a variable-length memory area (not shown) into which large-capacity communication data for more than 4 bytes are stored, is written into the communication information area 12a by the writing processor 1. Here, the communication data and the pointer are generally called as communication information. Therefore, in the above explanation, it is assumed that the communication information (shown by gray square in the drawing) is written into the communication information area 12a.

The connection information (link pointer: shown by an arrow in the drawing) showing a connection relationship between the element 11a and the next element 11b, and the information of writing completion (binary expression flag) which shows as to whether or not the communication information is written into the communication information area 12a are written as marks into a mark area 13a. This information of writing completion (flag) can show a state whether the communication information is written into the communication information area 12a or not.

In addition, the marks are initialized in an initial state that the communication information is not written into the communication information area 12a. The communication information and the marks are written respectively into the communication information area 12a and the mark area 13a of the element 11a simultaneously with one access by means of the writing processor 1. Similarly, the communication information and the marks are read simultaneously with one access by means of the reading processor 2.

The element 11b is a memory area of the 1-access unit, and similarly to the element 11a, it is composed of a communication information area 12b (4 bytes) into which communication information is written, and a mark area 13b into which mark are written. Moreover, the marks are composed of information of writing completion which shows as to whether or not that the communication information is written into the communication information area 12a, and connection information which shows a connection relationship between the element 11b and the next "empty" element 11c. The element 11c is connected to the element 11b, and it is a memory area of 8 bytes. This element 11c has a communication information area 12c and a mark area 13c similarly to the element 11a. However, no information is written into the communication information area 12c and the mark area 13c, and they are empty (in the drawing, shown by slanted lines).

In addition, one "empty" element 11c is always provided in the queue 10. In the case where a new element unit is added to the queue 10, a state that an "empty" element unit is one is kept. The queue 10 for transmitting communication data from the writing processor 1 to the reading processor 2 is provided between the writing processor 1 and the reading processor 2.

Figure 2:
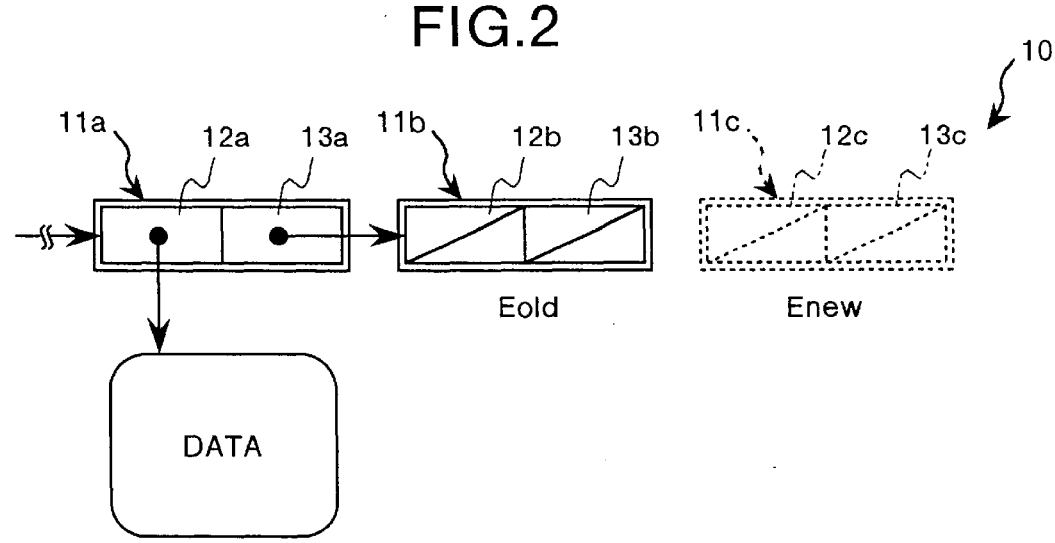
FIG. 2 is a diagram for explaining a flow of data at the time of registering into a queue according to the first embodiment.
Figure 3:
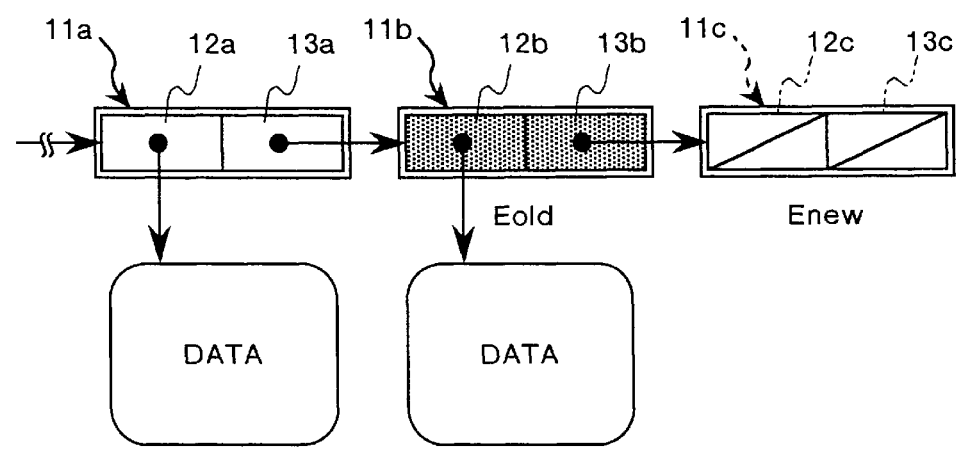
FIG. 3 is a diagram for explaining a flow of data at the time of registering into the queue according to the first embodiment.
Figure 4:
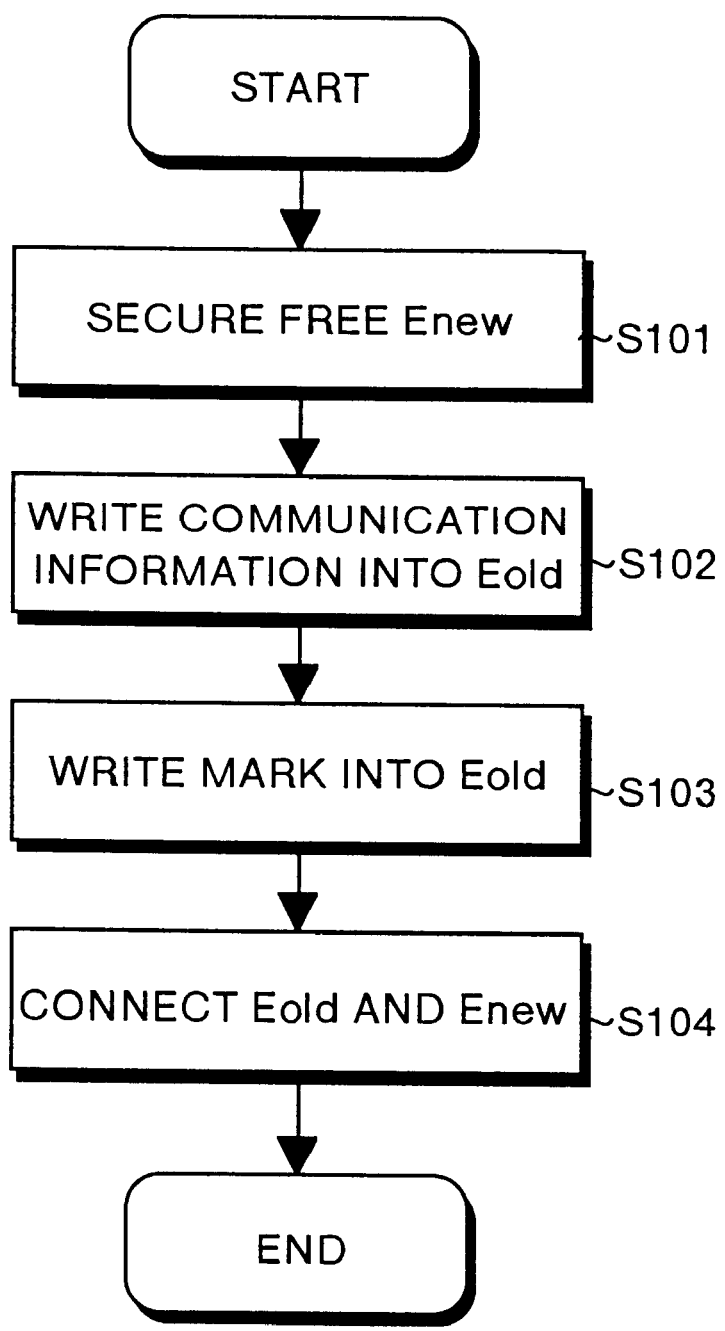
FIG. 4 is a flowchart for explaining the registering operation into the queue according to the first embodiment.

Next, there will be explained below the registering operation into the queue 10 by means of the writing processor 1 with reference to FIG. 2 through FIG. 4. FIG. 2 and FIG. 3 are diagrams for explaining flows of data at the time of registering into the queue 10, and FIG. 4 is a flowchart for explaining the registering operation into the queue 10. At first, the writing processor 1 goes through the following procedure in order to register the communication information into the queue 10.

As for a premise, as shown in FIG. 2, the queue 10 is composed of the element 11a and the "empty" element 11b which is connected to the element 11a. Namely, in this case, communication information and marks are not registered into the communication information area 12b and the mark area 13b of the "empty" element 11b. In this state, at first the writing processor 1 newly secures the "empty" element 11c (Enew) (see FIG. 2) in addition to the "empty" element 11b at step S101 shown in FIG. 4, and goes to step S102.

Next, the writing processor 1 once accesses to the "empty" element 11b (Eold) registered in the queue 10 so as to perform three operations at steps S102 through S104 simultaneously. The three operations can be performed simultaneously because the element 11b is a memory area of the 1-access unit.

In the above three operations, as shown in FIG. 3, the writing processor 1 writes communication information into the communication information area 12b of the "empty" element 11b (Eold) (step S102), and simultaneously writes marks into the mark area 13b of the "empty" element 11b (Eold) (step S103). Further, the writing processor 1 connects the element 11b (Eold) to the new "empty" element 11c (Enew) (step S104).

Information of writing completion which shows that the communication information is written into the element 11b, and connection information which shows a connection relationship between the element 11b and the "empty" element 11c are written into the mark area 13b of the element 11b. Since the operations at steps S102 through S104 are performed inseparably (simultaneously) in such a manner, the coherence is always kept between the communication information written by the writing processor 1 and the communication information read by the reading processor 2.

Figure 5:
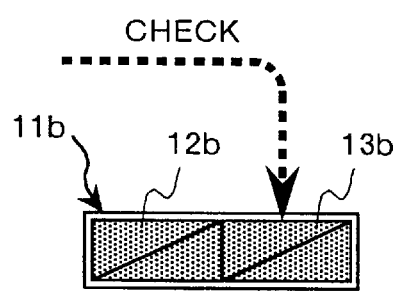
FIG. 5 is a diagram for explaining a flow of data at the time of obtaining from the queue according to the first embodiment.
Figure 6:
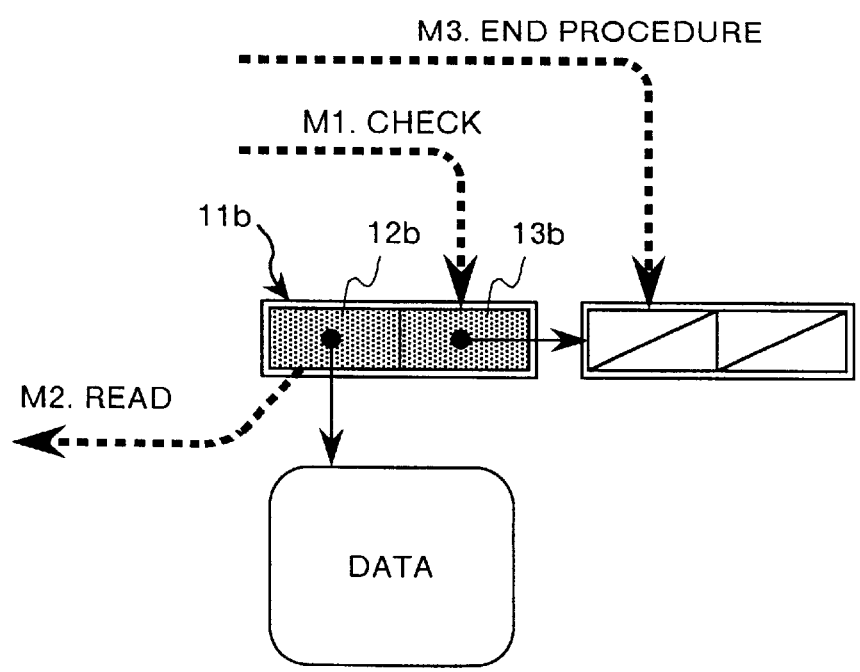
FIG. 6 is a diagram for explaining a flow of data at the time of obtaining from the queue according to the first embodiment.
Figure 7:
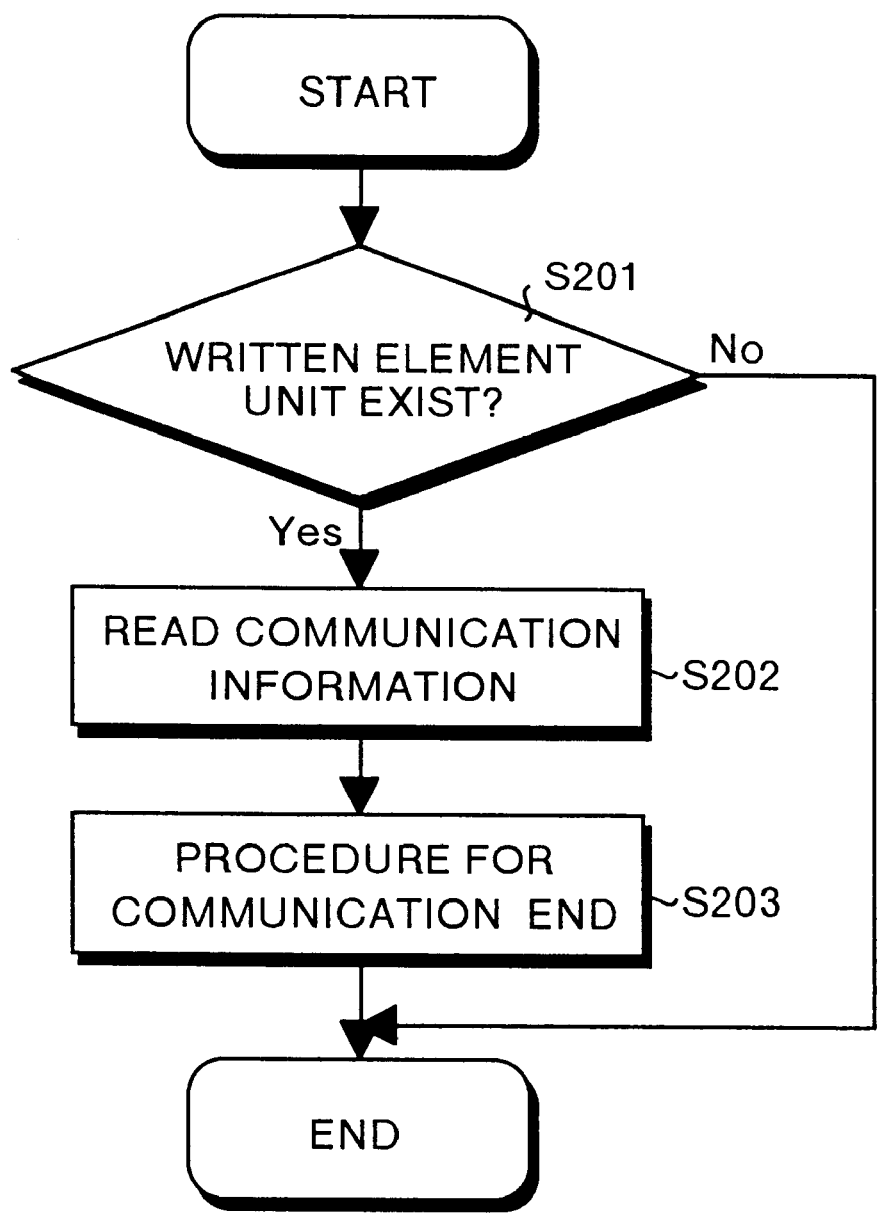
FIG. 7 is a flowchart showing for explaining the obtaining operation from the queue according to the first embodiment.

Next, there will be explained below the obtaining operation from the queue 10 by means of the reading processor 2 with reference to FIGS. 5 through 7. FIG. 5 is a diagram for explaining an example that obtaining of communication information from the queue 10 is failed. FIG. 6 is a diagram for explaining an example that the obtaining of the communication information from the queue 10 is succeeded. Moreover, FIG. 7 is a flowchart for explaining the obtaining operation from the queue 10.

FIG. 5 illustrates an example that the element 11b is accessed by the reading processor 2. In this case, the element 11b is the "empty" element, and thus communication information and marks are not written into the communication information area 12b and the mark area 13b of the element 11b.

In such a state, in order to obtain communication information from the queue 10, the reading processor 2 takes the following steps. At first, the reading processor 2 accesses to the element 11b shown in FIG. 5 so as to perform the operation at step S201 shown in FIG. 7. Namely, the reading processor 2 judges as to whether or not the written element unit exists based on the marks in the mark area 13b of the element 11b at step S201.

The reading processor 2 judges as to whether or not communication information is written into the communication information area 12b of the element 11b based on the marks. In this case, since marks are not written, the reading processor 2 makes the judgment at step S201 as "NO" and ends the access to the "empty" element 11b. Namely, in this case, the reading processor 2 fails to obtain the communication information.

Meanwhile, in the example shown in FIG. 6, the reading processor 2 checks as to whether or not a written element exists in the queue 10 at step S201 (M1 of FIG. 6), and if a written queue element exists at S201, the reading processor 2 reads the communication information from the queue element at step S202 (M2 of FIG. 6). Further, the reading processor 2 takes the step of ending communication at step S203 (M3 of FIG. 6) so as to end the obtaining operation.

More concretely, as shown in FIG. 6, it is assumed that the communication information and the marks are written into the communication information area 12b and the mark area 13b of the element 11b respectively. In this state, when the reading processor 2 accesses to the element 11b shown in FIG. 6, the reading processor 2 performs the operations at steps S201 and S202 shown in FIG. 7 simultaneously. Namely, the reading processor 2 recognizes that the communication information is written into the communication information area 12b from the marks in the mark area 13b of the element 11b at step S201 so as to make the judgment as "YES". Thereafter, the reading processor 2 performs the operation at step S202 and the operation at step S203.

Namely, the reading processor 2 reads the communication information from the communication information area 12b of the element 11b (step S202), and cancels the registering of the element 11b so as to take the step of ending communication (step S203) and end the obtaining operation. Here, the two operations at the steps S201 and S202 can be performed simultaneously because the element 11b is a memory area of the 1-access unit. According to the above procedure, the queue 10 which does not use the exclusive lock between different two processors (the writing processor 1 and the reading processor 2) can be realized.

As mentioned above, according to the first embodiment, in the queue 10 having a plurality of elements for operating data on the shared memory 3, at the time of registering, "empty" elements are secured in plural elements, and data are registered in the "empty" elements. At the time of obtaining, the element where the data are registered in the plural elements is obtained, and the data are read from the obtained element, and the element is the 1-access unit. As a result, since an area which is queue-operated simultaneously by the plural processors is divided, the operation relating to exclusive lock is unnecessary so that the processing speed can be heightened.

In addition, the first embodiment is applied to the multi-processor system so that the performance of a software for exchanging data between the plural processors can be improved. Such a multi-processor system will occupy the mainstream in the case which requires performance, but in such a system, the apparatus of the first embodiment is required for high speed in a wide range from trunk software such as OS (Operating System) to applications. In addition, marks which show registering/non-registering of the communication information and connection information are used in the queue 10 so that the managing ability of the queue 10 can be improved.

In the first embodiment, for example, the communication information to be written into the communication information area 12a (see FIG. 1) contains either a communication data within 4 bytes or a pointer of communication data with the amount of more than 4 bytes. Here, also when the pointer is written as the communication information into the communication information area 12a, the above-mentioned operation relating to exclusive lock is unnecessary. Namely, when the pointer is used for communication data of more than 4 bytes, the operation relating to the exclusive lock is not required.

Figure 8:
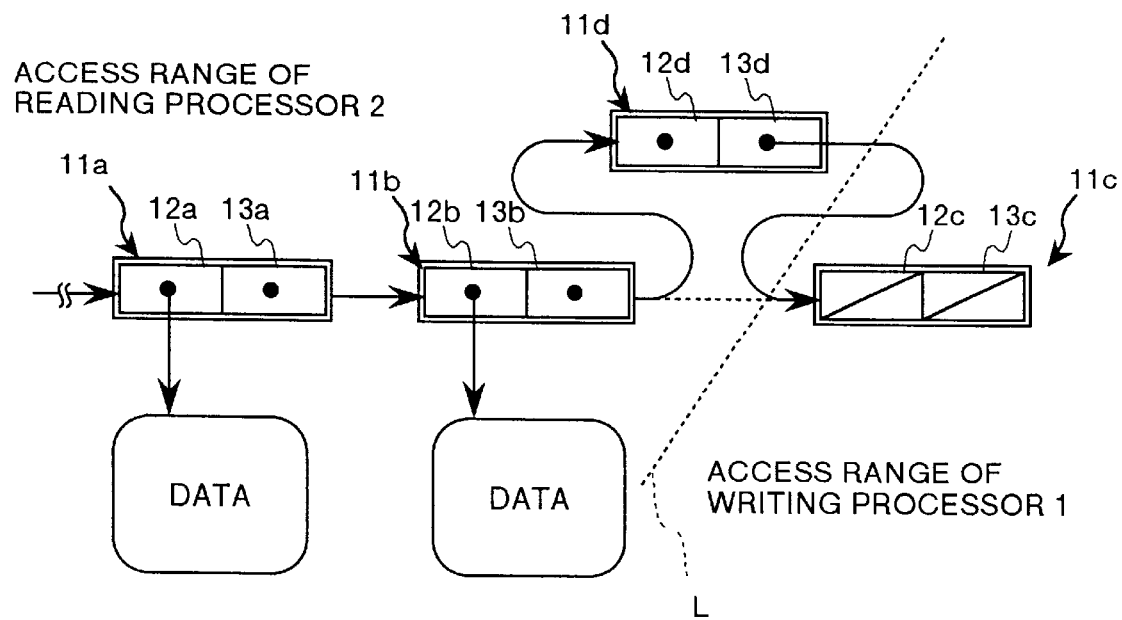
FIG. 8 is a diagram for explaining an access method of the interprocessor data communication apparatus according to a second embodiment.

The first embodiment explained the method of adding a queue element unit on the side of the writing processor 1, but similarly the queue element unit may be added on the side of the reading processor 2. FIG. 8 is a diagram for explaining an access method of the interprocessor data communication apparatus according to the second embodiment of the present invention. In the second embodiment, as for the queue 10 shown in FIG. 1, the access ranges of the reading processor 2 and the writing processor 1 are separated from each other by a boundary line L in FIG. 8. Namely, the reading processor 2 accesses to the element 11a and the element 11b, whereas the writing processor 1 accesses to the "empty" element 11c.

Since the access ranges are separated in such a manner, when the reading processor 2 is provided with a writing function as well as a original reading function, a new element 11d can be added between the element 11b and the "empty" element 11c without requiring the exclusive lock in its access range. Here, in order to provide both the reading and writing functions to the reading processor 2, both a data reading section 2b and a data writing section 2c shown in FIG. 14 are operated.

Figure 9:
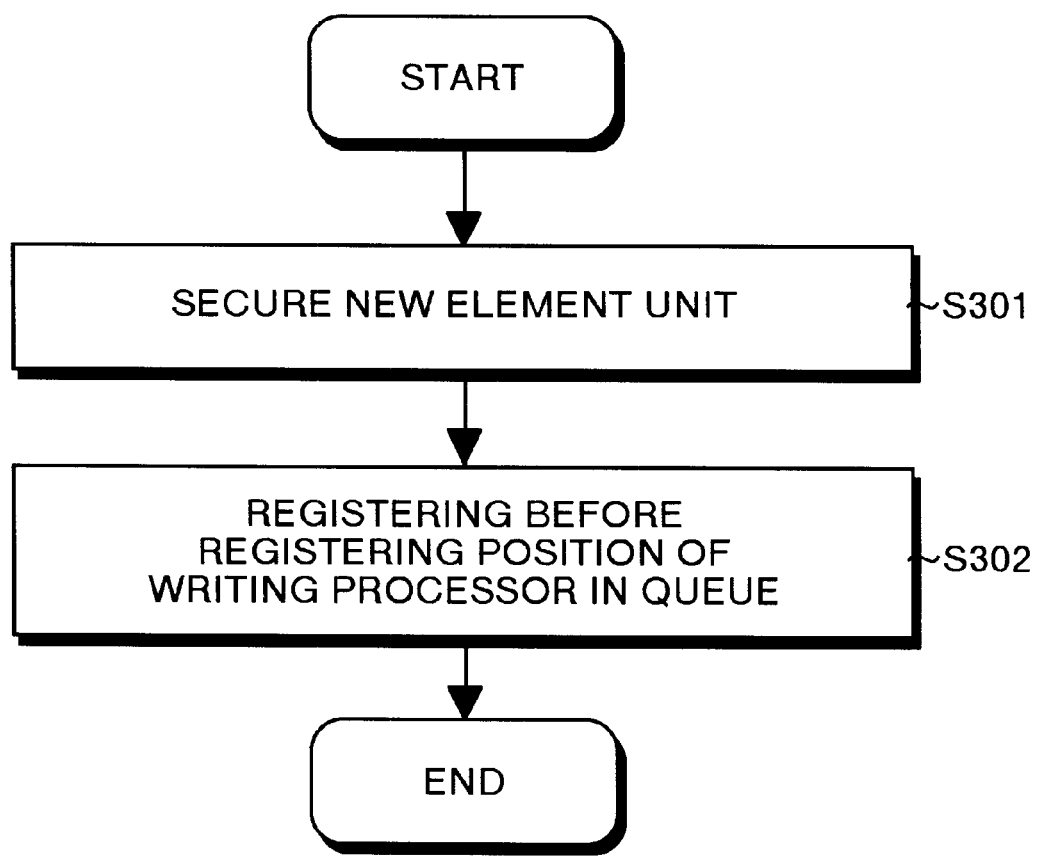
FIG. 9 is a flowchart for explaining a registering operation according to the second embodiment.

Now, there will be explained below concretely the above operations. FIG. 9 is a flowchart for explaining the registering operation according to the second embodiment. The reading processor 2 secures the new element 11d shown in FIG. 8 at step S301 shown in FIG. 9 and goes to step S302. The new element 11d has a communication information area 12d and a mark area 13d similarly to the element 11a. The reading processor 2 registers the new element 11d into the queue 10 before the registering position of the writing processor 1 at step S302.

Namely, the reading processor 2 updates the position information of the mark area 13b of the element 11b into position information showing a connection state between the element 11b and the element 11d, and updates position information of the mark area 13d of the element 11d into position information showing a connection state between the element 11d and the element 11c. As a result, the queue of the two writers (writing processor 1and reading processor 2)/one reader (reading processor 2) which does not require the operation relating to exclusive lock can be realized.

The above-mentioned first and second embodiments realize the queues of the one writer (writing processor 1)/one reader (reading processor 2) and the two writers (writing processor 1 and the reading processor 2)/one reader (reading processor 2), but the present invention is not limited to this. Like the third embodiment mentioned below, a queue of a plurality of writers/one reader may be realized.

Figure 10:
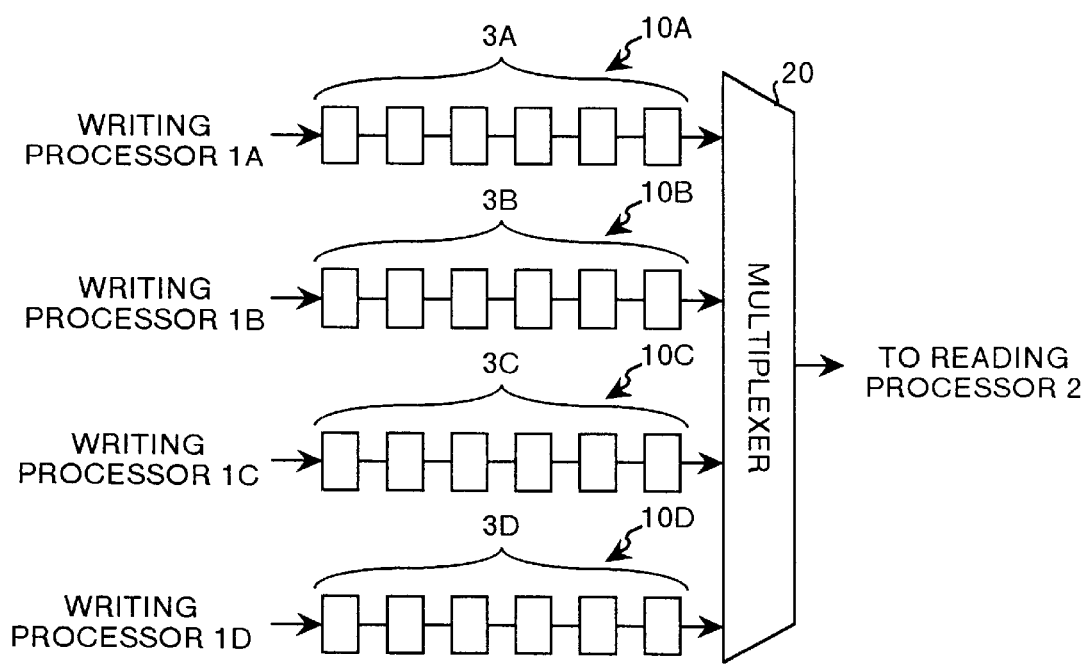
FIG. 10 is a block diagram showing the interprocessor data communication apparatus according to a third embodiment.

At first, the structure will be explained. FIG. 10 is a block diagram showing the interprocessor data communication apparatus according to the third embodiment of the present invention. When a number of writers is four, as shown in FIG. 10, four writing processors 1A, 1B, 1C and 1D are prepared. The interprocessor data communication apparatus is constituted so that the four writing processors 1A, 1B, 1C and 1D are connected to shared memories 3A, 3B, 3C and 3D respectively and are connected to one reading processor 2 via a multiplexer 20.

The shared memories 3A, 3B, 3C and 3D have queues 10A, 10B, 10C and 10D having the similar structure to the queue 10 (see FIG. 1) respectively. Moreover, the multiplexer 20 switches respective connection states between the reading processor 2 and the queues 10A through 10D. In FIG. 10, in such a manner, the queues 10A, 10B, 10C and 10D are prepared correspondingly to the writing processors 1A, 1B, 1C and 1D.

In addition, the writing processors 1A through 1D are linked to elements for registering in the queues 10A through 10D. Further, elements for obtaining in the queues 10A through 10D are linked to the reading processor 2 via the multiplexer 20. Such a structure can construct the whole queue structure of the plural writers/one reader.

Figure 11:
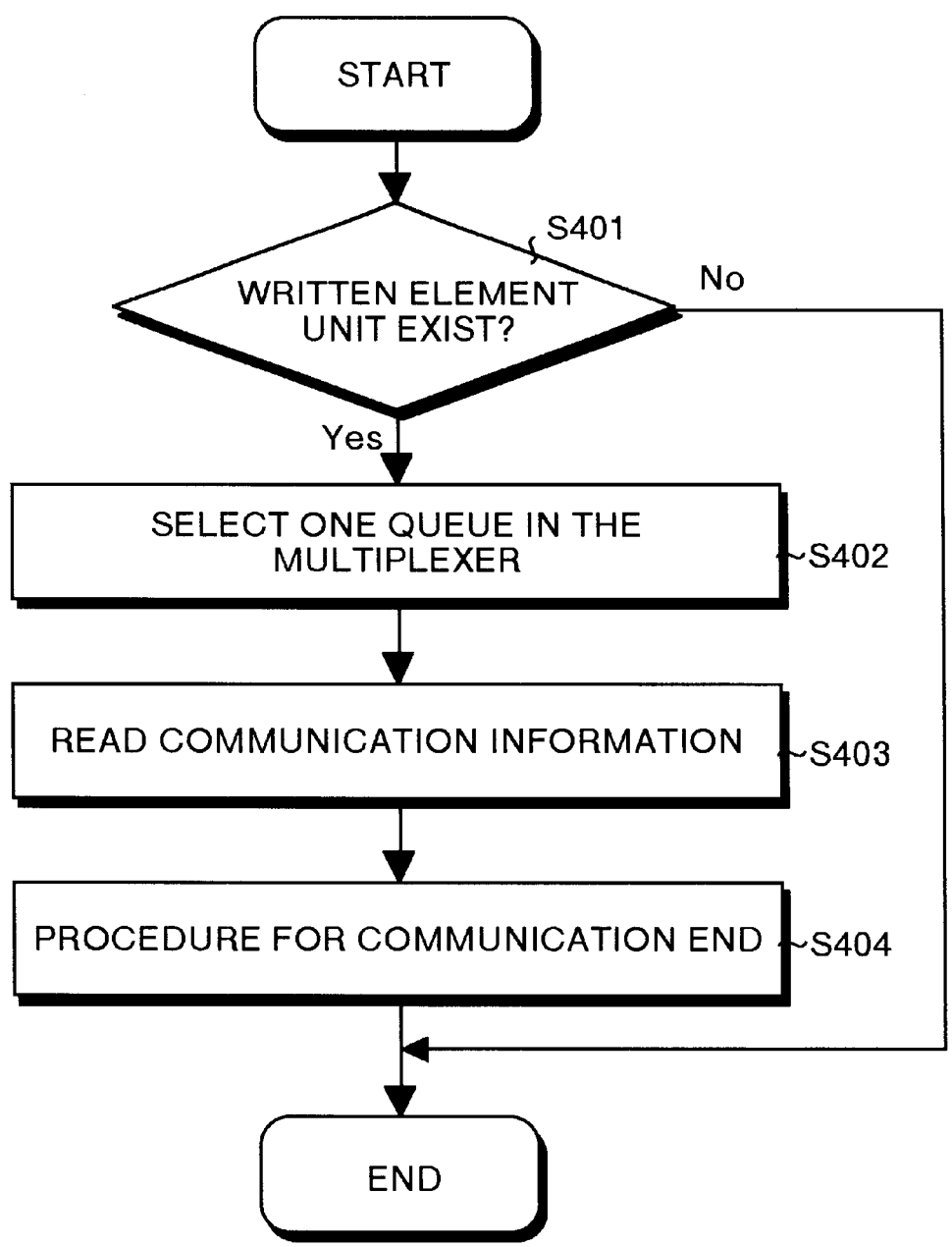
FIG. 11 is a flowchart for explaining an obtaining operation according to the third embodiment.

Next, the operation will be explained. FIG. 11 is a flowchart for explaining a obtaining operation of the reading processor 2 according to the third embodiment of the present invention. At step S401 shown in FIG. 11, the reading processor 2 judges as to whether or not there exists an element where communication information is written in the queues 10A through 10D via the multiplexer similarly to the first embodiment (FIG. 7: see step S201). When an element does not exist, the reading processor 2 makes the judgment as "NO" so as to end the obtaining operation. In this case, when, for example, the communication information is written into the element of the queue 10A, the reading processor 2 makes the judgment at step S401 as "YES" and goes to step S402.

After the queue 10A is selected by the multiplexer 20 at step S402, the reading processor 2 reads the communication information from the element of the queue 10A at step S403 similarly to the first embodiment (FIG. 7: see step S202). Further, the reading processor 2 takes the step of ending communication on the element of the queue 10A at step S404 (see step S203 in FIG. 7).

According to the above procedure, the queue operation can be realized without performing the operation relating to exclusive lock between the plural writers and the one reader. Namely, when the queues 10A through 10D having the same structure as that of the queue 10 in FIG. 1 correspond to the writing processors 1A through 1D, the communication via the queues can be realized without performing the operation relating to exclusive lock between arbitrary processors.

The above-mentioned first to third embodiments described the method of realizing the communication via the queue without performing the operation relating to exclusive lock at all. However, the present invention is not limited to this, and like the forth embodiment mentioned later, the operation relating to exclusive lock is performed partially within a range that the processing speed is not reduced in comparison with the conventional technique so that plural writers/one reader is constituted.

Figure 12:
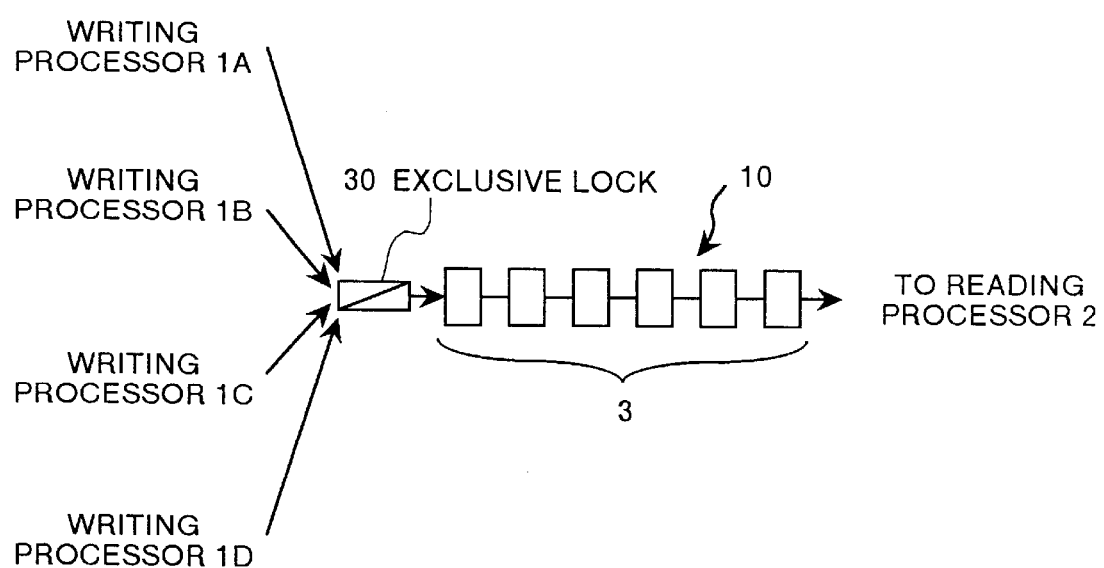
FIG. 12 is a block diagram showing the interprocessor data communication apparatus according to a forth embodiment.

At first, the structure will be explained. FIG. 12 is a block diagram showing the interprocessor data communication apparatus according to the forth embodiment of the present invention. In this diagram, in order to compare the third embodiment with the forth embodiment, the same reference numerals are given to the portions corresponding to one another. The interprocessor data communication apparatus shown in FIG. 12 is constituted so that the four writing processors 1A, 1B, 1C and 1D are connected to the one shared memory 3 and the shared memory 3 is connected to the reading processor 2. Namely, FIG. 12 illustrates the structure of the four writers/one reader. Moreover, in the queue 10 of the shared memory 3 (see FIG. 1), the element for registering is linked to one of the writing processors 1A through 1D.

In this case, since the writing processor to be linked forbids the other writing processors to perform the operation on the queue 10, the operation on the queue 10 is performed in a state that exclusive lock 30 is put on the queue 10. Namely, one writing processor of the writing processors 1A through 1D which obtains a right to put the exclusive lock 30 can perform the registering operation on the queue 10. However, the other writing processors cannot perform the registering operation. This structure is effective to a case where a lot of writing processors exist as shown in FIG. 12 or a case where the number is increased or decreased.

Figure 13:
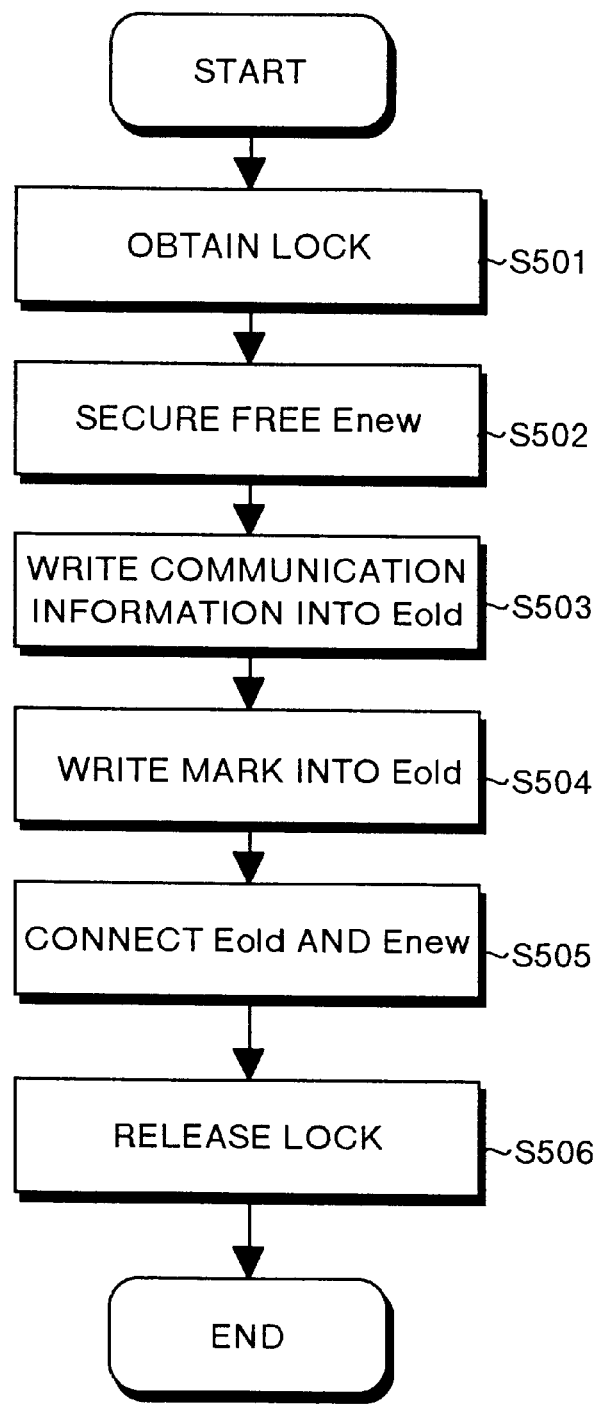
FIG. 13 is a flowchart for explaining a registering operation according to the forth embodiment.

Next, the operation will be explained. FIG. 13 is a flowchart for explaining the registering operation according to the forth embodiment. At first, at step S501, one of the writing processors 1A through 1D obtains the exclusive lock 30. In this case, the writing processor 1A obtains the exclusive lock 30. Therefore, only the writing processor 1A can perform the registering operation on the queue 10. Thereafter, the writing processor 1A performs the respective operations at steps S502 through S505 similarly to the above-mentioned steps S101 through S104 (see FIG. 4).

Namely, the writing processor 1A newly secures the "empty" element 11c (Enew) shown in FIG. 2, for example, independently from the "empty" element 11b at step S502 shown in FIG. 13, and goes to step S503. Next, the writing processor 1A once accesses to the "empty" element 11b (Eold) so as to perform the three operations at steps S503 through S505 simultaneously.

In these three operations, the writing processor 1A writes communication information into the communication information area 12b of the "empty" element 11b (Eold) (step S503) and simultaneously writes marks into the mark area 13b of the "empty" element 11b (Eold) (step S504). Further, the writing processor 1A connects the element 11b (Eold) and the new "empty" element 11c (Enew) (step S505).

At step S506, the writing processor 1A releases the exclusive lock 30 on the queue 10. Meanwhile, the reading processor 2 performs the operation similar to the obtaining operation (see FIG. 7) explained in the first embodiment. Since the operations at steps S503 through S505 are performed inseparably (simultaneously) in such a manner, coherence is always kept between the communication information which is written by one of the writing processors 1A through 1D and the communication information read by the reading processor 2.

In the forth embodiment, it is not necessary that the reading processor 2 puts the exclusive lock on the queue 10, but the writing processor 1A should perform the operation relating to the exclusive lock once. Therefore, the operation relating to the exclusive lock is not operated at all in the first embodiment, but the operation is performed once in the forth embodiment. As a result, in the forth embodiment, the versatility is improved further than the first embodiment, but the processing speed (performance) is lowered by single operation relating to exclusive lock. However, the processing speed is improved further than the conventional technique.

Figure 16:
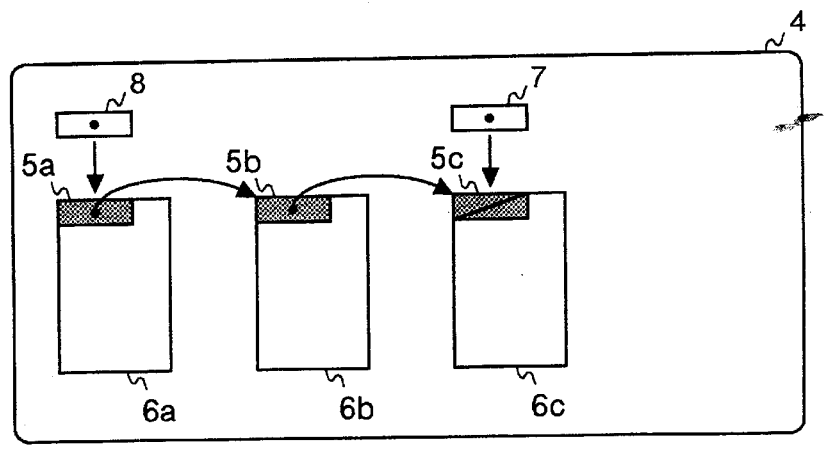
FIG. 16 is a diagram for explaining operations of the conventional multi-processor system.
Figure 16:
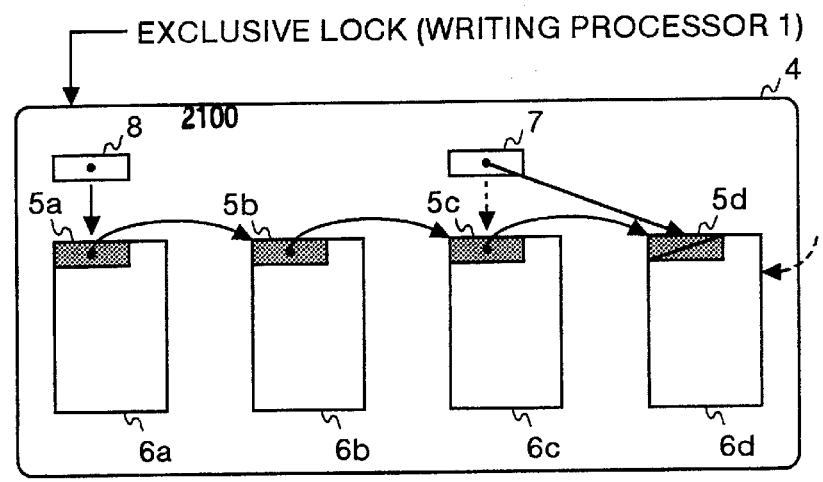
Figure 16:
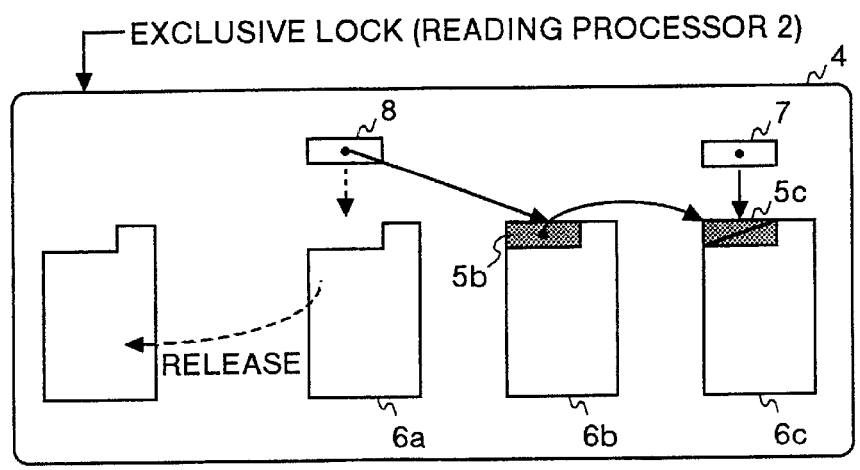

Namely, in the conventional technique, as described with reference to FIG. 16, both the writing processor and the reading processor require the total of two operations relating to exclusive lock (obtaining/releasing). In the forth embodiment, the writing processor may perform the operation relating to exclusive lock only once. Therefore, in the forth embodiment, since the number of operations relating to the exclusive lock is smaller by one than the conventional technique, the processing speed can be improved. Moreover, in the forth embodiment, since the shared memories whose number is the same as that of the writing processors should not prepared and only one shared memory 3 should be prepared, the structure can be simplified more than that in the third embodiment.

The first to forth embodiments of the present invention were described with reference to the drawings, but various modifications are possible within the scope of the gist of the present invention, and these modifications should not be eliminated from the scope of the invention. For example, the first to forth embodiments described the example that the 1-access unit in the element 11a or the like is 8 bytes, but this is one example, but this unit is suitably changed according to data writing/reading amount at the time of one access by means of the writing processor 1 and the reading processor 2. Therefore, the 1-access unit may be 8 bytes or 16 bytes.

In addition, the first to forth embodiments described individual processors for writing and reading, but needless to say, the respective processors composing the multi-processor system have the above-mentioned processing function of the writing processor and the processing function of the reading processor.

As mentioned above, according to the invention from the first aspect, in the queue having a plurality of elements and an empty element for operating data on the shared memory, after an empty element is newly secured by the registering unit at the time of registering, data are registered with one access. Meanwhile, the obtaining unit obtains an element of the plural elements where the data are registered, and reads the data from the obtained element with one access. As a result, the areas where a plurality of processors perform the queue operation simultaneously are separated, and thus the operation relating to exclusive lock is not necessary. As a result, the processing speed can be improved.

Further, the obtaining unit accesses to the element once so as to obtain communication information, connection information and information showing registering/non-registering at a time. Similarly, the registering unit accesses to the element once so as to register the above three pieces of information at a time. Namely, since three pieces of information can be obtained and registered with one access, the operation relating to exclusive lock is not necessary, and the processing speed can be improved.

Further, when pointers are used as communication information, the operation relating to exclusive lock is not necessary, and data whose size is larger than a size of the element can be treated.

Further, since the access range in the queue is separated into an empty element on the registering unit side and an element on the obtaining unit side, the registering unit cannot access to the element on the obtaining unit side. For this reason, the operation relating to exclusive lock is not necessary, and the obtaining unit can serve as the registering unit for adding a new element.

Further, a plurality of the registering unit are connected to independent shared memories respectively, and one multiplexer is connected to between the respective shared memories and the obtaining unit. For this reason, the plural registering unit/one obtaining unit in which the processing speed is improved can be constituted without performing the operation relating to exclusive lock on the queues of the shared memories by means of the registering unit.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An interprocessor data communication apparatus, comprising:

a shared memory having a queue having a plurality of elements including a first empty element, each of the plurality of elements having a first area and a second area;

a first processor configured to
add a second empty element to the queue,
write into the first area of the first empty element communication information related to communication data, and
write into the second area of the first empty element connection information indicating a connective relationship between the first and second empty elements, and write completion information indicating whether the communication information has been written in the first area of the first empty element; and a second processor configured to
access the second area of the first empty element and read the write completion information,
determine whether the communication information is written in the first empty element, based on the write completion information read, and
read the communication information from the first empty element if the second processor determines that the communication information has been written in the first empty element, wherein a memory area of each of the plurality of elements has a size such that all of the information written by the first processor and all of the information read by the second processor are written by the first processor or read by the second processor in an uninterruptible single access without requiring an exclusive lock on the queue.

2. The interprocessor data communication apparatus according to claim 1, wherein the communication information is a pointer which points to data written in variable-length memory area of said shared memory.

3. The interprocessor data communication apparatus according to claim 1, wherein
the queue has:
a first access range to be accessed by the first processor and including the second empty element; and
a second access range to be accessed by the sedon processor and including the plurality of elements, and
the second processor is configured to add a new element which connects the first and second access ranges.

4. The interprocessor data communication apparatus according to claim 1, further comprising:
a plurality of first processors;
a plurality of shared memories, each connected to one of said first processors; and
a multiplexer connected between said shared memories and said second processor.

5. The interprocessor data communication apparatus according to claim 1, further comprising a plurality of said first processors, wherein the shared memory is connected between the first processors and the second processor, and one of the first processors places an exclusive lock on the queue of said shared memory to perform writing.

6. An interprocessor data communication method, comprising:

utilizing a shared memory having a queue having a plurality of elements including a first empty element each of the plurality of elements having a first area and a second area;

using a first processor to
add a second empty element to the queue,
write into the first area of the first empty element communication information related to communication data, and
write into the second area of the first empty element connection information indicating a connective relationship between the first and second empty elements, and write completion information indicating whether the communication information has been written in the first area of the first empty element; and using a second processor to
access the second area of the first empty element and read the write completion information,
determine whether the communication information is written in the first empty element, based on the write completion information read, and
read the communication information from the first empty element if the second processor determines that the communication information has been written in the first empty element, wherein a memory area of each of the plurality of elements has a size such that all of the information written by the first processor and all of the information read by the second processor are written by the first processor or read by the second processor in an uninterruptible single access without requiring an exclusive lock on the queue.

7. An interprocessor data communication apparatus, comprising:

a first processor configured to
add a second empty element to a shared memory queue having a queue having a plurality of elements including a first empty element, each of the plurality of elements having a first area and a second area,
write into the first area of the first empty element communication information related to communication data, and
write into the second area of the first empty element connection information indicating a connective relationship between the first and second empty elements, and write completion information indicating whether the communication information has been written in the first area of the first empty element; and a second processor configured to
access the second area of the first empty element and read the write completion information,
determine whether the communication information is written in the first empty element, based on the write completion information read, and
read the communication information from the first empty element if the second processor determines that the communication information has been written in the first empty element, wherein a memory area of each of the plurality of elements has a size such that all of the information written by the first processor and all of the information read by the second processor are written by the first processor or read by the second processor in an uninterruptible single access without requiring an exclusive lock on the queue.

8. A data processing apparatus having a shared memory with a queue having a plurality of elements including a first empty element, each of the plurality of elements having a first area and a second area, the data processing apparatus comprising:

a first processor configured to
add a second empty element to the shared memory queue,
write into the first area of the first empty element communication information related to communication data, and
write into the second area of the first empty element connection information indicating a connective relationship between the first and second empty elements, and write completion information indicating whether the communication information has been written in the first area of the first empty element; and a second processor configured to
access the second area of the first empty element and read the write completion information,
determine whether the communication information is written in the first empty element, based on the write completion information read, and
read the communication information from the first empty element if the second processor determines that the communication information has been written in the first empty element, wherein a memory area of each of the plurality of elements has a size such that all of the information written by the first processor and all of the information read by the second processor are written by the first processor or read by the second processor in an uninterruptible single access without requiring an exclusive lock on the queue.

* * * * *